United States Patent Office 2,822,254
Patented Feb. 4, 1958

2,822,254

NITRILE RUBBER BONDED ABRASIVE MODIFIED BY A DIKETONE

George J. Goepfert, Cincinnati, Ohio, and Carl von Doenhoff, Niagara Falls, N. Y., assignors to The Carborundum Company, Niagara Falls, N. Y., a corporation of Delaware No Drawing. Application April 22, 1955
Serial No. 503,335

10 Claims. (Cl. 51—298)

This invention relates to abrasive articles bonded with a nitrile rubber modified by a diketone.

This application is a continuation-in-part of our copending application Serial No. 251,242, filed October 13, 1951, and now abandoned.

It has previously been suggested that grinding wheels be made with a nitrile rubber such as a copolymer of butadiene with acrylic or methacrylic nitrile. (See Kistler Patent 2,384,683.) It has further been suggested that grinding wheels be made with such a bond which has been modified by the addition of a phenol-aldehyde resin. (See Allison Patent 2,229,880.)

While abrasives made according to the two patents referred to have been used to some extent they have the very serious objection that when they are used for dry grinding the smoke or fumes emitted from the wheel due to the breakdown of the bond from the heat of grinding are very objectionable. They have been variously described as "acrid," "disgusting," and "nauseating" and at times have been known to induce nausea in operators who are exposed to them for substantial lengths of time. This deficiency has seriously reduced the extent of use of this bond. We have discovered that the objectionable odor can be obviated by incorporating in the wheel a small amount of any of certain classes of diketones, including all alpha or 1,2-diketones, which inherently contain a conjugated system of two double bonds or unsaturated groups (the two carbonyl groups), and non-alpha diketones which have a conjugated system of double bonds comprising a C=C linkage at the alpha-beta position on at least one side of each carbonyl group.

It is accordingly an object of the invention to provide a grinding wheel bonded with a nitrile rubber which will not emit nauseating odors when used for dry grinding. Another object of the invention is to make a grinding wheel bonded with a nitrile rubber modified by the incorporation of a diketone. Another object of the invention is to make a grinding wheel with a nitrile rubber bond modified by the incorporation of an alpha diketone or a diketone having an alpha-beta conjugated C=C linkage on at least one side of each carbonyl group. Other objects of the invention will appear from a consideration of the disclosure hereinafter made.

The ability to overcome the nauseating odors emitted by the grinding wheels bonded with nitrile rubber appears to be specific to certain types of diketones. We have found that monoketones are not effective for this purpose. We have also found that non-alpha diketones which do not have an alpha-beta conjugated C=C linkage or which have a conjugated C=C linkage with only one of the carbonyl groups are not effective. On the other hand the effective diketones are the alpha diketones which may have no additional conjugated linkage, which may have a conjugated C=C linkage on one side of the two adjacent carbonyl groups, or which may have conjugated C=C linkages on both sides of the adjacent carbonyl groups.

Specific diketones which we have successfully employed in our invention are benzoquinone, naphthaquinone, anthraquinone, chloranil, acetyl caproyl, acetyl benzoyl, dibenzoyl, dibenzoylmethane and dibenzoylethylene.

In developing our invention we found that there was a minimum amount of the diketone which would overcome this nauseating odor and that while additional amounts did not materially improve odor they tended to modify the bond in such a way as to reduce the grade of the wheel or make it "soft." Consequently, from a practical standpoint there is a critical range of the diketone which should be added.

We will now illustrate our invention by reference to specific examples, it being understood that the examples are not intended to be limitative.

Example I

A grinding wheel was made according to conventional practice from a mix of the following composition:

| | Grams |
|---|---|
| 54 grit aluminum oxide | 2744 |
| Liquid phenol-formaldehyde resin | 80 |
| Dioctyl phthalate | 80 |
| Sulfur | 160 |
| Cryolite | 600 |
| Benzil | 16 |
| "Hycar OR–15" (nitrile rubber) | 320 |

The mixture was made on a two-roll mill in the standard manner well known in the industry by first passing the rubber through the rolls to soften it, adding the liquid resin, and continuing rolling to incorporate it through the mass, then adding the other constituents of the bond and continuing mixing until they were well blended with the rubber, and finally rolling the abrasive grain into the bond mixture. The mix was finally rolled into a slab from which wheels 16 inches in diameter, $\frac{3}{32}$ inch thick and provided with a 1 inch arbor hole were cut and cured according to conventional practice by baking for 12 hours at 320° F.

The wheels were used for cutting off steel tubing in a test in which they were compared with similar mixes made without the benzil. They had a grinding efficiency practically identical with that of wheels made without the benzil. The fumes were described as being "acrid and very slightly nauseating," whereas the fumes from the unmodified wheel were distinctly nauseating.

Example II

A wheel was made from a mix identical with that of Example I except that the benzil was increased to 80 parts and the abrasive grain was correspondingly reduced to 2680. Upon testing it was found that this wheel had a somewhat lower grinding efficiency but that the fumes were described as "acrid but not nauseating."

Example III

A mix was prepared having the following composition:

| | Grams |
|---|---|
| Fused alumina, 46 grit | 2640 |
| Liquid phenolic resin | 80 |
| Depolymerized rubber | 40 |
| Sulfur | 160 |
| Powdered phenolic resin | 120 |
| Cryolite filler | 600 |
| Anthraquinone | 40 |
| "Hycar OR–15" | 120 |
| Masticated crude rubber | 200 |

The mix was prepared on a two-roll mill in a manner similar to that described with respect to Example I, the anthraquinone being added in the form of a dry powder simultaneously with the cryolite filler. The mix was rolled into slabs and wheels made from it as described in Example I.

Example IV

A mix was prepared as described in Example III except that dibenzoylethylene was employed in place of the anthraquinone.

Example V

A wheel was made as described in Example III except that 35 parts of chloranil were substituted for the anthraquinone.

Example VI

A wheel was made as described in Example I except that 30 parts of naphthaquinone were substituted for the benzil.

Additional experiments with other types of nitrile rubber sold under the trademark "Paracoil" and the designations "26NS" and "35NS" showed the same improvement in the odor of the fumes when a diketone of the class described above was added as was found with the "Hycar OR." Nitrile rubbers are available which are copolymers of 85–50 parts butadiene and 15–50 parts acrylonitrile or methacrylic nitrile. The heat resistance of these rubbers increases with an increase in the proportion of the nitrile and while our invention is applicable with all such rubbers it is especially useful with those containing the higher nitrile contents since they are best adapated for use as abrasive bonds and yet their fumes are the most obnoxious, about 55% butadiene to 45% acrylonitrile being most preferred.

The amount of bond used in making rubber bonded grinding wheels varies within the range of about 5–20%. Since the diketone tends to reduce the grade we have sometimes found it desirable to substitute for the nitrile rubber other rubbery bonds including other synthetic rubbers and natural rubber. In general, we prefer to make compositions in which the diketone constitutes about 1% of the total composition and prefer that it does not exceed 4% of the weight of the article.

The amount of diketone required to overcome the nauseating odor is dependent somewhat upon the composition of the nitrile rubber and also on the use to which the wheel is put as well as the conditions under which it is used. For example, if the rooms are well ventilated and the number of such wheels used is comparatively small, it is not necessary to use as much diketone as is needed where a considerable amount of grinding with such wheels is being done in a confined space and with poorer ventilation. The effect of the fumes is aggravated where they are relatively concentrated and correspondingly a larger amount of diketone is needed to overcome this sickening effect of the fumes. We have used as little as 5% and as much as 50% benzil based on the nitrile rubber and corresponding mol percentages of the other diketones. In general we have found that 20–40% of benzil based on the nitrile rubber, and corresponding mol percentages of the other diketones is satisfactory for most purposes.

While we have described the production and use of cut-off wheels, our invention is equally well adapted to the manufacture of other types of wheels where the relatively high heat-resistance of nitrile rubbers is desired.

We are unable to explain why fumes from the nitrile rubbers have this nauseating effect but we do know that such is the case where any of a number of different varieties of nitrile rubber is used. Since the difficulty is common to wheels bonded with rubbers made by copolymerizing nitriles with conjugated diolefins such as butadienes or substituted butadienes it would appear that the objectionable odors come from some compound containing nitrogen which is released when the wheel becomes heated in use. We are equally at a loss to explain why the addition of one of these particular diketones will neutralize or overcome this nauseating odor but have found that, in fact, it does.

We have illustrated our invention by reference to specific examples in which conventional fillers, plasticizers, certain specific diketones, and vulcanizing agents are used. The invention is not limited to the specific compositions of the examples and in practicing it we may use other modifications commonly known in the abrasive art, being restricted only by the scope of the appended claims.

We claim:

1. A rubber bonded abrasive article comprising a major proportion of abrasive grain and a minor proportion of a binder therefor, said binder comprising essentially a copolymer of a conjugated diolefin and a nitrile selected from the group consisting of acrylic and methacrylic nitrile and a diketone selected from the group consisting of alpha diketones and non-alpha diketones having a conjugated system of double bonds comprising a C=C linkage at the alpha-beta position on at least one side of each carbonyl group, the amount of diketone present being in the range of the mol equivalent of about 5–50% of benzil based on the copolymer.

2. An article as claimed in claim 1 in which the conjugated diolefin is butadiene.

3. An article as claimed in claim 1 in which the nitrile is acrylonitrile.

4. An article as claimed in claim 3 in which the range of butadiene to acrylonitrile is in the range of 85–50 butadiene to 15–50 acrylonitrile.

5. An article as claimed in claim 1 in which the diketone is benzil.

6. An article as claimed in claim 1 in which the diketone is anthraquinone.

7. An article as claimed in claim 1 in which the diketone is chloranil.

8. An article as claimed in claim 1 in which the diketone is naphthaquinone.

9. An article as claimed in claim 1 in which the diketone is dibenzoylethylene.

10. A process for reducing the odor that is produced upon use of a rubber-bonded abrasive article that is made by admixing a major proportion of abrasive grain and a minor proportion of a binder therefor, said binder comprising essentially a copolymer of a conjugated diolefin and a nitrile selected from the group consisting of acrylic and methacrylic nitrile, and then curing said admixture; said process comprising incorporating in said article during said admixing a diketone selected from the group consisting of alpha diketones and non-alpha diketones having a conjugated system of double bonds comprising a C=C linkage at the alpha-beta position on at least one side of each carbonyl group, the amount of said diketone incorporated in said binder being in the range of the mol equivalent of about 5% to about 50% of benzil based on the copolymer.

References Cited in the file of this patent

UNITED STATES PATENTS 2,406,319    Brooks et al. _____ Aug. 27, 1946